(12) United States Patent
Fu et al.

(10) Patent No.: US 8,782,593 B2
(45) Date of Patent: Jul. 15, 2014

(54) THERMAL ANALYSIS OF INTEGRATED CIRCUIT PACKAGES

(71) Applicant: Taiwan Semiconductor Manufacturing Company, Ltd., Hsin-Chu (TW)

(72) Inventors: Chung-Min Fu, Chungli (TW); Wan-Yu Lo, Chungli (TW); Meng-Fu You, Hsin-Chu (TW); Po-Hsiang Huang, Hsin-Chu (TW); Cheng-Chieh Hsieh, Yongkang District (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 13/626,448

(22) Filed: Sep. 25, 2012

(65) Prior Publication Data

US 2014/0089876 A1    Mar. 27, 2014

(51) Int. Cl.
*G06F 17/50* (2006.01)

(52) U.S. Cl.
USPC ........... 716/138; 716/100; 716/132; 716/136; 716/137; 716/139

(58) Field of Classification Search
USPC ............. 716/100, 132, 136, 137–139; 726/34
See application file for complete search history.

(56) References Cited

U.S. PATENT DOCUMENTS

| | | | | |
|---|---|---|---|---|
| 2,569,646 | A * | 10/1951 | Wade et al. | 703/5 |
| 6,983,432 | B2 * | 1/2006 | Hayes | 716/113 |
| 7,222,312 | B2 * | 5/2007 | Ferguson et al. | 705/51 |
| 7,299,438 | B2 * | 11/2007 | Hosono | 716/113 |
| 7,347,621 | B2 * | 3/2008 | Sri-Jayantha et al. | 374/166 |
| 7,627,841 | B2 * | 12/2009 | Shakouri et al. | 716/136 |
| 7,792,302 | B2 * | 9/2010 | Oren et al. | 380/277 |
| 7,823,096 | B2 * | 10/2010 | Katagiri et al. | 716/136 |
| 8,136,076 | B2 * | 3/2012 | Bachina et al. | 716/126 |
| 8,286,111 | B2 * | 10/2012 | Chandra et al. | 716/110 |
| 8,302,039 | B2 * | 10/2012 | Ferguson et al. | 716/100 |
| 8,352,230 | B2 * | 1/2013 | Kim et al. | 703/13 |
| 8,434,044 | B1 * | 4/2013 | Goldman et al. | 716/116 |
| 2001/0047508 | A1 * | 11/2001 | Miura et al. | 716/8 |
| 2005/0071792 | A1 * | 3/2005 | Ferguson et al. | 716/4 |
| 2006/0075374 | A1 * | 4/2006 | McElvain | 716/17 |
| 2006/0088772 | A1 * | 4/2006 | Zhang | 430/5 |
| 2008/0127028 | A1 * | 5/2008 | Rittman | 716/19 |
| 2008/0288906 | A1 * | 11/2008 | Kopischke et al. | 716/9 |
| 2009/0092803 | A1 | 4/2009 | Bita et al. | |
| 2012/0317529 | A1 * | 12/2012 | Agarwal et al. | 716/113 |
| 2013/0145335 | A1 * | 6/2013 | Koushanfar et al. | 716/133 |

OTHER PUBLICATIONS

Altera, "AN 519: Stratix IV Design Guidelines", May 2009, Altera, AN-519-1.1, pp. 1-61.*

* cited by examiner

*Primary Examiner* — Stacy Whitmore
(74) *Attorney, Agent, or Firm* — Slater and Matsil, L.L.P.

(57) ABSTRACT

A method includes retrieving a first component information of a secured portion of a package, wherein the first component information is encrypted. The step of retrieving includes decrypting the first component information. A thermal resistance-network (R-network) is generated from the decrypted first component information. A temperature map of the package is generated using the thermal R-network and a second component information of an unsecured portion of the package, wherein the secured portion and the unsecured portion are bonded to each other.

19 Claims, 5 Drawing Sheets

```
###Boundary condition####
Conv_top=100
Conv_side=10
Conv_bottom= 10
Ambient_temp=85
###Layer info####
Layer(Heat Sink 36) { ... }
Layer(TIM 30) { ... }
Layer(TIM 32) { ... }
Layer(DIE 28) { ... }
Layer(Bump 26) { ... }
Layer(Interposer 24) { ... }
Layer(Bump/Underfill 22) { ... }
Layer(Package substrate 20) { ... }
###Structure Info####
Tier(Bottom ){
stack=(Package substrate 20, 0,
0)(Bump/Underfill 22, 1,1 )(Interposer 24, 1,1)
}
Tier(UnD){
stack=(Bumps 26, 1 ,2)(DIE 28,1,2)
stack=(Bump/Underfill 22, 3,2)(DIE 28,3,2)
}
Tier(Upper){
stack=(TIM 30, 1, 1 )(TIM 32, 1, 1 )(Heat Sink 34, 0,
0)
}
```

| #Material | #Thermal Conductivity(Watt/°C m) | #HeatCapacity(J/°C m$^3$) |
|---|---|---|
| Aluminum | 237.599 | 1 |
| molding | 0.669 | 10 |
| microbump | 50.208 | 0.5 |
| Silicon | 124.042 | 3 |

```
.global Vss
.subckt Design N_1_1 N_1_2 N_1_3 ... N_1_25 \
N_2_1 N_2_2 N_2_3 ... N_2_25 \
N_3_1 N_3_2 N_3_3 ... N_3_25 \
...
N_25_1 N_25_2 N_25_3 ... N_25_25
***Ambient temperature
Vamb Vss 0 85
***Structure above dies
R_1_1_B N_1_1 N_1_1_c 961.538
...
R_25_25_B N_25_25 N_25_25_c 384615
R_25_25_air N_25_25_e Vss 2e+06
.ends
```

50

```
N_1_1 0.1 0.1
N_1_2 0.3 0.1
N_1_3 0.5 0.1
...
N_1_25 4.9 0.1
N_2_1  0.1 0.3
...
N_25_25 4.9 4.9
```

52

THERMAL ANALYSIS OF INTEGRATED CIRCUIT PACKAGES

BACKGROUND

Thermal analysis of integrated circuit packages is often performed in the design and manufacturing of integrated circuits. Through the thermal analysis, the temperatures of the integrated circuit packages may be determined, and hence it may be found whether the resulting packages meet design specification or not. This ensures that the packages are not overheated, for example. Conventionally, when the thermal analysis of a package was preformed, the structure and the properties of the components in the package are collected. For example, when a package includes a package substrate, an interposer, a die, and a heat sink, the thicknesses, the power maps, the materials, and the stacking of these components are collected, and provided to an Electronic Design Automation (EDA) tool to generate a temperature map of the package. The EDA tool may calculate the temperature map through matrix calculation.

In some situations, the plurality of components in a package belongs to more than one manufacturing or design companies, and hence the thermal analysis requires cross-company information exchange. For example, the package substrate and the heat sink may be manufactured by different companies, and these companies may not want the detailed structures and material properties disclosed to the personnel that performs the thermal analysis. Missing the key information, the thermal analysis is not practical. Although some of the structures and material properties may be assumed, since the thermal analysis results are sensitive to the change of the structures and material properties, the results of the thermal analysis may deviate significantly from the actual result.

BRIEF DESCRIPTION OF THE DRAWINGS

For a more complete understanding of the embodiments, and the advantages thereof, reference is now made to the following descriptions taken in conjunction with the accompanying drawings, in which:

FIG. 4 illustrates an exemplary structure file, in which the structures of the secured portion and/or the unsecured portion may be defined;

FIG. 5 illustrates an exemplary tech file, in which the properties of the materials used in the secured portion and/or the unsecured portion may be defined in accordance with exemplary embodiments;

DETAILED DESCRIPTION OF ILLUSTRATIVE EMBODIMENTS

The making and using of the embodiments of the disclosure are discussed in detail below. It should be appreciated, however, that the embodiments provide many applicable inventive concepts that can be embodied in a wide variety of specific contexts. The specific embodiments discussed are illustrative, and do not limit the scope of the disclosure.

A method for performing a thermal analysis on a package is provided in accordance with various exemplary embodiments. The intermediate stages of performing the thermal analysis are illustrated. The variations and the operation of the embodiments are discussed. Throughout the various views and illustrative embodiments, like reference numbers are used to designate like elements.

Figure 1:
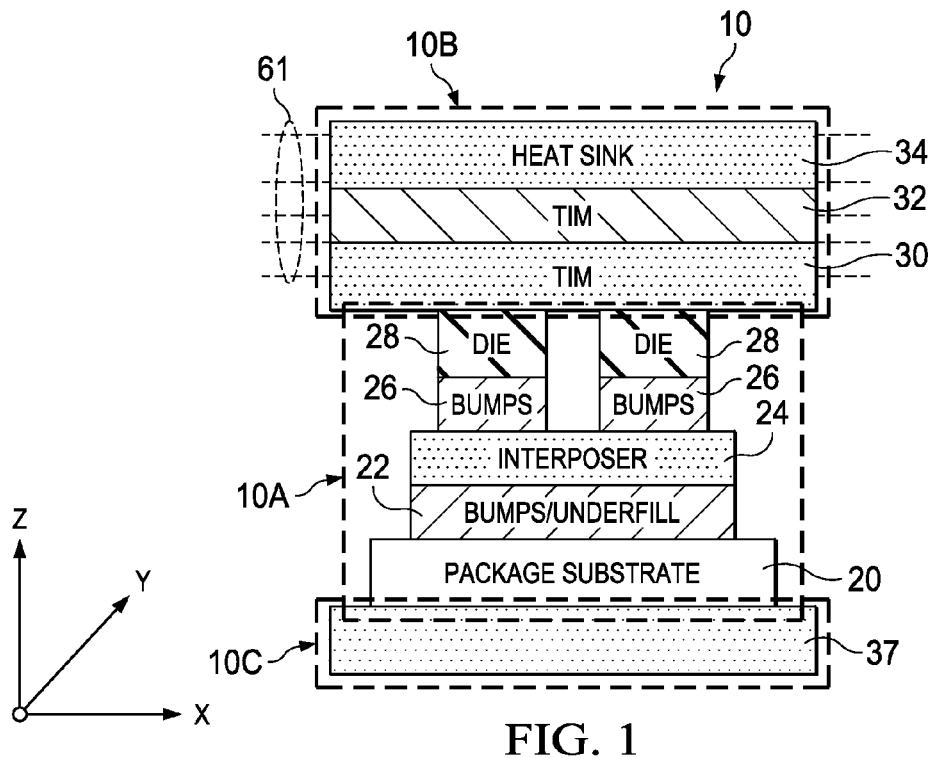
FIG. 1 illustrates an exemplary package including a secured portion and an unsecured portion.

FIG. 1 illustrates a cross-sectional view of an exemplary package 10, on which a thermal analysis is performed in accordance with embodiments. It is appreciated that the illustrated package 10 is merely an example, and the actual analyzed package may have other structures different from illustrated. Package 10 includes package substrate 20, bumps and underfill 22, interposer 24, bumps 26, device dies 28, Thermal Interface Material (TIM) 30, TIM 32, and heat sink 34. In the illustrative example, the detailed information of package substrate 20, bumps and underfill 22, interposer 24, bumps 26, and dies 28 are available to, and can be disclose to, the Electronic Design Automation (EDA) tool and/or the personnel who performs the thermal analysis. The detailed information may include, and is not limited to, layer stacking information, geometry information, thicknesses, materials, boundary conditions, and the like. Accordingly, the respective portion of the package (including package substrate 20, bumps and underfill 22, interposer 24, bumps 26, and dies 28 in combination) is hence referred to as unsecured portion 10A of package 10. TIMs 30 and 32 and heat sink 34, on the other hand, belong to an entity that does not want to reveal the detailed information of TIMs 30 and 32 and heat sink 34 to the EDA tool and the personnel who performs the thermal analysis. Accordingly, this portion of the package is referred to as secured portion 10B of package 10.

Figure 2:
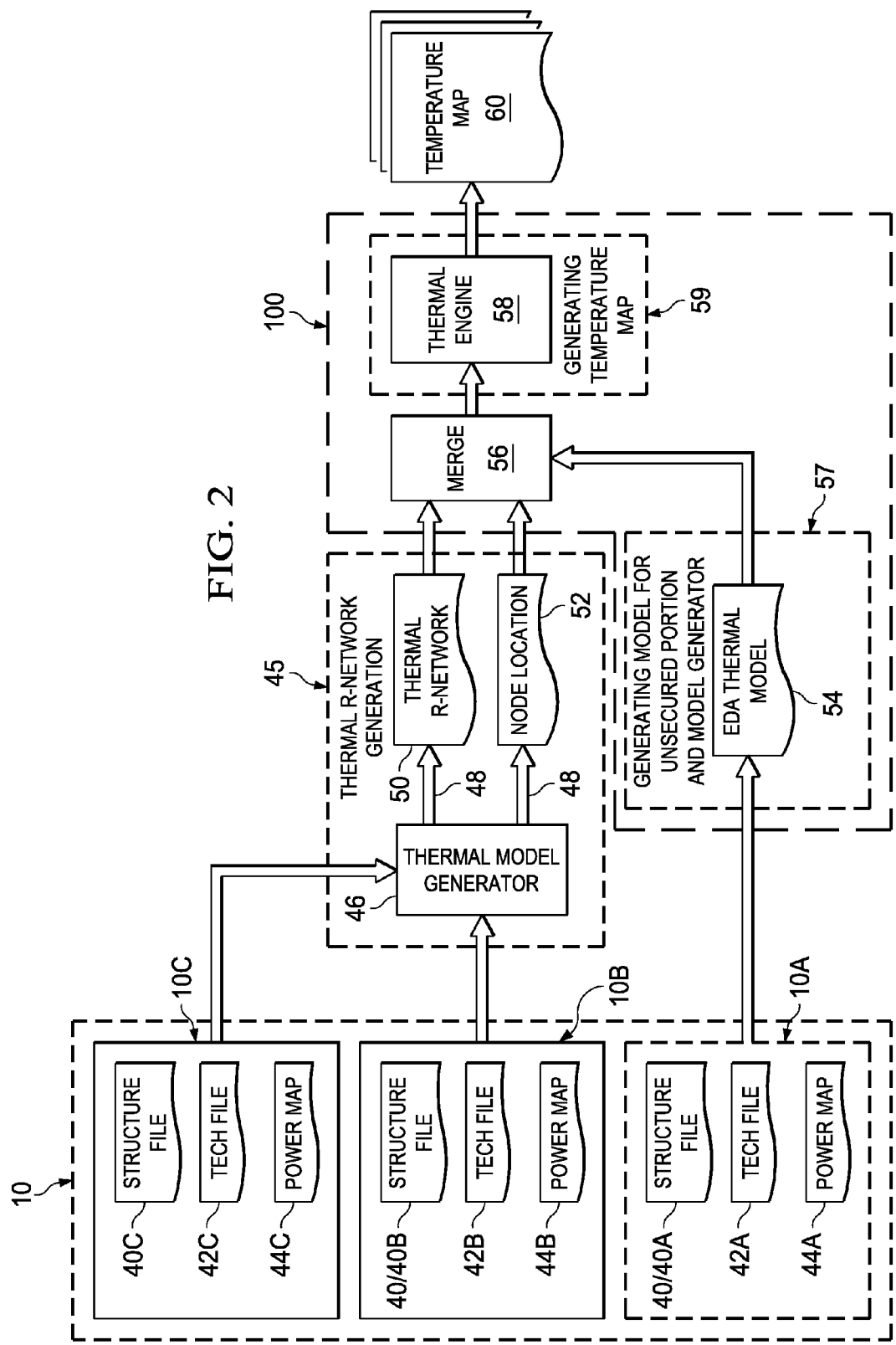
FIG. 2 illustrates a process flow for performing a thermal analysis in accordance with exemplary embodiments.

FIG. 2 illustrates an exemplary process flow for performing the thermal analysis in accordance with exemplary embodiments, wherein the thermal analysis is performed to obtain the thermal analysis result (such as a temperature map), of package 10. The thermal analysis in FIG. 2 may be performed using EDA tool 100, which includes thermal model 54, model generator 57, and thermal engine 58. The exemplary package 10 in FIG. 2 may have the structure in FIG. 2, and includes the unsecured portion 10A and secured portion 10B as in FIG. 1. The detailed component information of unsecured portion 10A and secured portion 10B may be described using, for example, files or other formats, wherein the component information of portions 10A and 10B are also referred to using reference notations 10A and 10B, respectively. The component information includes, and is not limited to, the layer stacking information, the geometry information, the thicknesses, the materials, the boundary conditions, and the like, for example, of the components in unsecured portion 10A and/or secured portion 10B.

In some embodiments, the component information of unsecured portion 10A is described in structure file 40A, tech file 42A, and power map 44A. The component information of secured portion 10B is described in structure file 40B, tech file 42B, and power map 44B. The details of the exemplary structure file 40A and tech file 42A are described in FIGS. 4 and 5, respectively. In alternative embodiments, the component information may be in different formats other than files. Unsecured portion 10A is accessible, and hence the respective files 40A, 42A, and 44A are not encrypted. Secured portion 10B is not to be accessed by the user of EDA tool 100 directly. Accordingly, files 40B, 42B, and 44B are encrypted, and cannot be decrypted by EDA tool 100 directly. In the embodiments, the unsecured component information 10A and secure component information 10B are separate from each other, and are processed differently. Although they may also be combined into the same file(s). Power maps 44A and 44B may describe three-dimensional power distribution in unsecured portion 10A and secure portion 1B, respectively.

Secure component information 10B is processed by thermal model generator 46, which may be provided by the manufacturer of secure portion 10B. Thermal model generator 46 is configured to decrypt the encrypted files 40B, 42B, and 44B, and generate (step 48) thermal resistance-network (R-network) 50 using the secured component information 10B. Thermal R-network 50 represents the thermal behavior of secured portion 10B (FIG. 1). The generation of thermal R-networks and a node location files using the respective component information is known in the art, and hence the details are not discussed herein. The details of thermal R-network 50 are described in FIGS. 6 and 7. Furthermore, a node location file 52 is also generated (step 48) by thermal model generator 46. Thermal model generator 46 may be integrated with EDA tool 100 or remain separated from EDA tool 100. Accordingly, portion 45 of the process flow in FIG. 2 may be, or may not be, a portion of the process steps performed by EDA tool 100.

Figure 3:
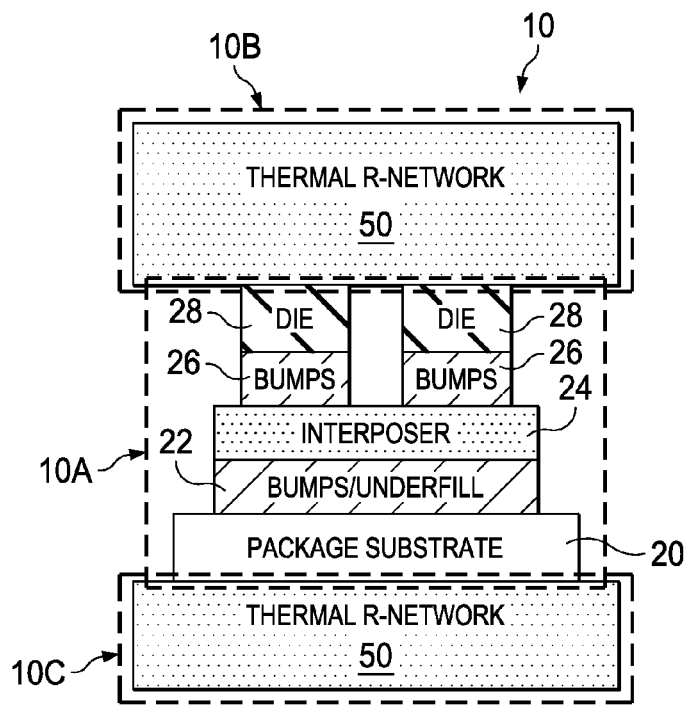
FIG. 3 illustrates the modeling of the secured portion of the package using a thermal R-network in accordance with exemplary embodiments.

Since R-network 50 and node location file 52 represent the thermal behavior of secure component 10B, as shown in FIG. 3, when the thermal analysis is performed, thermal R-network 50 and node location file 52 may be used to replace the details structure of secure component information 10B in FIG. 1. As shown in FIG. 3, EDA tool 100 (FIG. 2) may thus combine thermal R-network 50 with unsecured component information 10A to perform the thermal analysis. Accordingly, EDA tool 100 no longer needs the detailed component information (such as files 40B, 42B, and 44B in FIG. 2) in the thermal analysis.

EDA tool 100 may, or may not, include EDA thermal model 54, which is used by EDA tool 100 to process the unsecured component information 10A. In some exemplary embodiments, EDA thermal model 54 may be used to generate (step 57) using a model generator (also denoted as 57) a modeling data, which may be another thermal R-network similar to thermal R-network 50. Accordingly, EDA tool 100 may merge (step 56) the thermal R-network of secured portion 10B with the thermal R-network of unsecured portion 10A, and provides the merged information to thermal engine 58. Alternatively, EDA tool 100 may not process unsecured component information 10A before the merging step 56. Instead, EDA tool 100 may merge (step 56) thermal R-network 50, node location file 52, and the unprocessed unsecured component information 10A, and provides the merged information to thermal engine 58. Thermal engine 58 then use the merged information to generate (step 59) temperature map 60, which is an exemplary thermal analysis result. Temperature map 60 may be a three-dimensional map including a plurality of nodes distributed in a three-dimensional space, with each of the nodes representing a physical point in package 10 (FIG. 1). Each of the nodes corresponds to a temperature. Accordingly, temperature map 60 reflects the temperature distribution of package 10. The generation of temperature map 60 using thermal R-network 50 and the detailed unsecured component information 10A is within the knowledge of one of ordinary skill in the art, and hence is not discussed in detail herein.

FIGS. 4 through 8 illustrate some details involved in FIG. 2 in accordance with exemplary embodiments. It is appreciated that FIGS. 4 through 8 merely illustrate examples, and the embodiments may be implemented differently with the teaching of the embodiments. Referring to FIG. 4, structure file 40 is illustrated. It is appreciated that the illustrated structure file 40 includes the secured structure file 40B and unsecured structure file 40A combined together. In these examples, the portions related to secured portion 10B (including TIM 30, TIM 32, and heat sink 34) are actually encrypted, although they are shown as plain text in FIG. 4. On the other hand, the portions related to unsecured portion 10A (including package substrate 20, bumps and underfill 22, interposer 24, bumps 26, and dies 28) are not encrypted. In alternative embodiments, structure file 40 may be separated into files 40A and 40B as shown in FIG. 2, with structure file 40A storing the structure information of unsecured portion 10A, and structure file 40B storing the structure information of secured portion 10B. The structure information in structure file 40 (or 40A and 40B) may include, for example the layers (such as layers heat sink 36 in FIG. 1), how the components are stacked (the "Tier" description), boundary conditions, ambient temperature, etc. In some exemplary embodiments, the item "Layer(Heat Sink 36) { . . . }" in structure file 40 describe the detailed information of heat sink 36, wherein the information in the bracket may include the material, the size, the thickness, etc., of heat sink 36 in FIG. 1. As another example, "Tier(Bottom){stack=(Package substrate 20, 0, 0)(Bump/Underfill 22, 1, 1)(Interposer 24, 1, 1)}" means that the bottom tier in FIG. 1 includes package substrate 20, Bump/Underfill 22, and Interposer 24, which are located at relative locations (0, 0), (1, 1), and (1, 1), respectively. Boundary conditions indicate the conditions at the boundaries of the package 10. For example, "Conv_top=100" means that the top layer of heat sink 34, which top layer contacts air, has a heat convection coefficient equal to 100, and "Ambient_temp=85" means the temperature of the environment, in which package 10 is located, is 85° C.

FIG. 5 illustrates a portion of an exemplary tech file 42B, which is also shown in FIG. 2. FIG. 5 illustrates some exemplary properties, such as thermal conductivities and heat capacity of some materials used in package 10. Tech files 42A may also be similar to tech file 42B. In addition, the tech files 42B and 42A of secured portion 10B and unsecured portion 10A, respectively, may be combined into a same file, which includes encrypted portions and unencrypted portions, or may be separated into different files. Tech file 42B lists the properties, such as thermal conductivities of the materials, which materials are specified in structure file 40 (FIG. 4). Therefore, by combining the information in structure file 40/40B and tech file 42B, thermal model generator 46 (FIG. 2) may find the thermal conductivity information of the layers in package 10 (FIG. 1).

Figure 6:
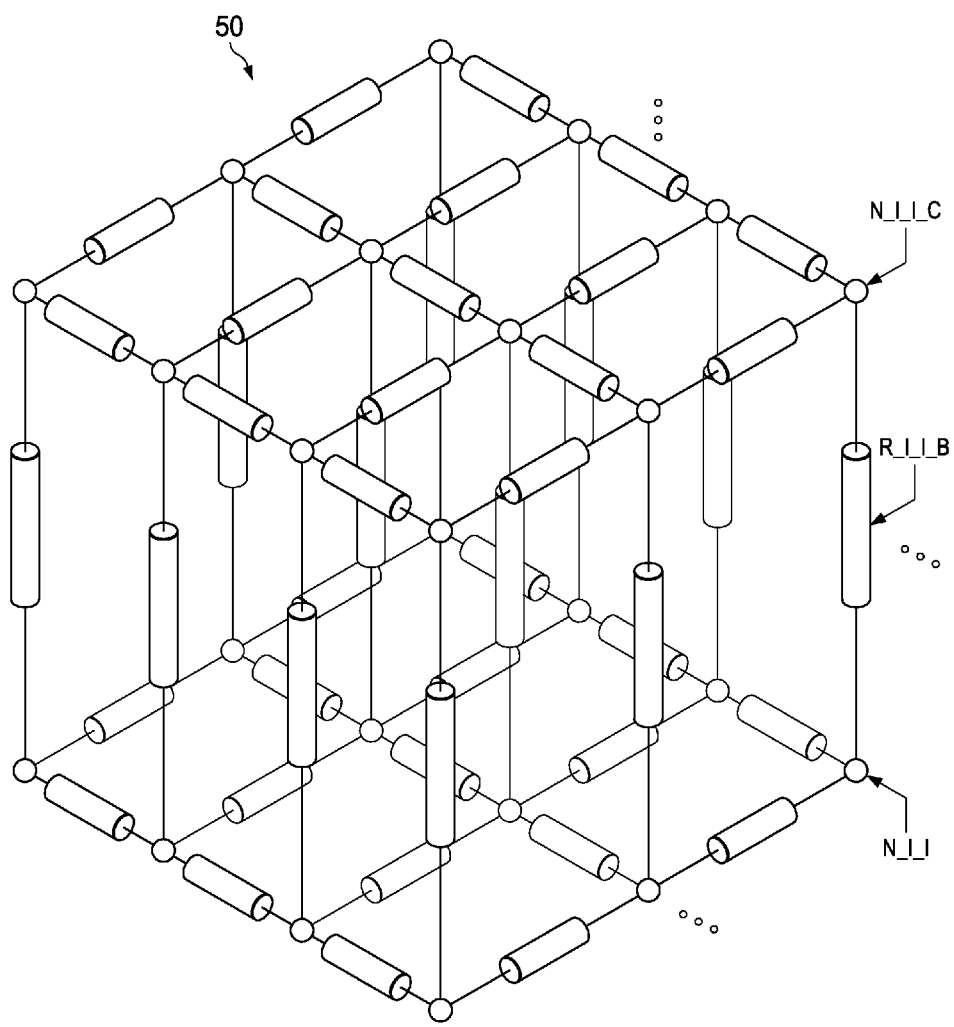
FIG. 6 illustrates an exemplary thermal R-network that may be used to represent the structure of the secured portion of the package in accordance with exemplary embodiments.

FIG. 6 illustrates a portion of a schematic thermal R-network 50 as shown in FIG. 3. Referring back to FIG. 1, secured portion 10B, which is a three-dimensional structure, may be partitioned horizontally (in X direction and Y direction) and vertically (in Z direction). As a result, secured portion 10B is partitioned into a plurality of layers, with each layer including an array. For example, assuming secured portion 10B is partitioned along planes 61, there will be six partitioned layers. If secured portion 10B is partitioned into a 256×256 array in each of the partitioned layers, then secured portion 10B will be partitioned into 256×256×6 portions. Each of the portions is represented as a node in FIG. 6, and given a name, such as N_1_1, N_1_1_c, etc. In these examples, the thermal R-network 50 in FIG. 6 should have 256×256×6 nodes, although only a small portion is illustrated. The three-dimensional thermal R-network 50 may be represented (described) using a file. The node names are listed in a file that represents the thermal R-network, wherein FIG. 7 illustrates a portion of the file.

Referring again to FIG. 6, the thermal properties in each node and neighboring nodes are represented using thermal resistors (such as R_1_1_B). The thermal resistors exist between neighboring nodes. Due to different materials (that have different thermal conductivities) in different nodes, the thermal resistors may change from node to node. With all material properties, which are specified in structure file 40B and tech file, already known, the thermal resistance values of the thermal resistors may be calculated. For example, as shown in FIG. 6 and FIG. 7, thermal resistance R_1_1_B, which is the thermal resistance of the thermal resistor between nodes N_1_1 and N_1_1_c, is 961.538 (which may be an absolute value or a normalized value).

Figures 7, 8, 9:
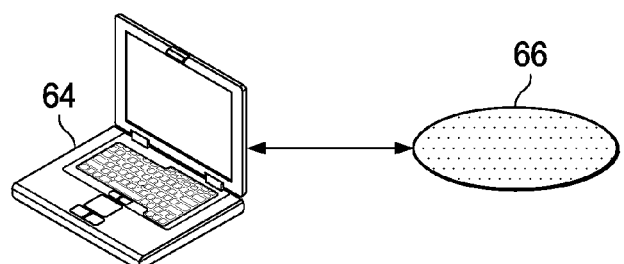
FIG. 7 illustrates an exemplary file format, in which the thermal R-network is described.
FIG. 8 illustrates an exemplary formation of a node location file, in which the locations of the nodes in the thermal R-network are described.
FIG. 9 illustrates a computer or a network server that is used to perform the steps in the thermal analysis in accordance with embodiments.

FIG. 8 illustrates a node location file describing the locations of the nodes in thermal R-network 50 (FIGS. 6 and 7). For example, in FIG. 8, the item "N_1_1 0.1 0.1" represents that node N_1_1 is at a location with X coordinate equal to 0.1 and Y coordinate equal to 0.1. The unit may be an absolute value or a normalized value. Referring back to FIG. 2, EDA tool 100, when knowing the locations of each of the nodes in thermal R-network 50, may shift the position of thermal R-network 50 relative to the position of the underlying unsecured portion 10A (FIG. 3) to simulate different results.

The embodiments may be applied to packages having more complex structures. For example, referring to FIG. 1, there is another package component, for example, Printed Circuit Board (PCB) 37 underlying package substrate 20, and package component 37 is also a secured portion whose component information is not to be disclosed. Referring to FIG. 3, PCB 37 is treated as secured portion 10C, and is handed the same way as secured portion 10B. For example, referring to FIG. 2, structure files 40B and 40C, tech files 42B and 42C, and power maps 44B and 44C are all encrypted. Thermal model generator 46 may decrypt structure file 40B and 40C, tech files 42B and 42C, and power maps 44B and 44C, and generate thermal R-networks 50 and node location files 52 for both secured portions 10B and 10C. EDA tool 100 then merges thermal R-networks 50 and location files 52 of both secured portions 10B and 10C with unsecured portion 10A to generate the temperature map 60 in FIG. 2.

In the embodiments, thermal model generator 46 (FIG. 2) and EDA tool 100 may include hardware and software (program codes). Alternatively, each of thermal model generator 46 and EDA tool 100 may include software (computer program codes), but does not include hardware. The program codes of thermal model generator 46 and EDA tool 100 may be embodied on a non-transitory storage media (66 in FIG. 9), such as a hard drive, a disc, or the like. Furthermore, the intermediate and final results of the embodiments may be saved on non-transitory computer-readable medium (66 in FIG. 9) such as hard drives, discs, and the like. For example, the various files such as structure files, tech files, power maps, thermal-R networks, location files, and the like may be saved on the non-transitory computer-readable medium. In addition, the process steps as shown in FIG. 2 may also be executed by a computer, a network server, or the like (64 in FIG. 10), which retrieves program codes for performing the steps (such as 45, 56, 56, and 59) in FIG. 2.

In the embodiments, referring back to FIG. 2, EDA tool 100 and the personnel performing the thermal analysis can only obtain the thermal R-network 50 and node location file 52. The detailed information of secured portion 10B is not provided to EDA tool 100 and the personnel. The proprietary information of secured portion 10B is thus hidden, while the quality of the thermal analysis is not scarified.

In accordance with embodiments, a method includes retrieving a first component information of a secured portion of a package, wherein the first component information is encrypted. The step of retrieving includes decrypting the first component information. A thermal R-network is generated from the decrypted first component information. A temperature map of the package is generated using the thermal R-network and a second component information of an unsecured portion of the package, wherein the secured portion and the unsecured portion are bonded to each other.

In accordance with other embodiments, a method includes merging a thermal R-network and a component information of an unsecured portion of a package, wherein the thermal R-network represents a secured portion of the package. The secured portion and the unsecured portion are bonded to each other. A temperature map of the package is generated using the thermal R-network and the component information of the unsecured portion, wherein the step of generating the temperature map is performed by a computer.

In accordance with yet other embodiments, a method includes decrypting a component information of a secured portion of a package, generating a thermal R-network from the component information, and generating a location file of the secured portion of the package. The step of generating the thermal R-network is performed using a computer.

Although the embodiments and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A method comprising:
   retrieving a first component information of a secured portion of a package, wherein the first component information is encrypted, and wherein the step of retrieving comprises decrypting the first component information;
   generating a thermal resistance-network (R-network) from the decrypted first component information; and
   generating a temperature map of the package using the thermal R-network and a second component information of an unsecured portion of the package, wherein the secured portion and the unsecured portion are bonded to each other, wherein the step of generating the temperature map is performed by a computer.

2. The method of claim 1 further comprising:
generating a location file of the secured portion of the package from the decrypted first component information, wherein the location file is used in the generating the temperature map.

3. The method of claim 1, wherein the first component information comprises a information selected from the group consisting essentially of a layer stacking information, a geometry information, a thickness information, a material information, and combinations thereof.

4. The method of claim 1, wherein the thermal R-network comprises:
a plurality of nodes forming a three dimensional structure; and
a plurality of thermal resistors connected between neighboring ones of the plurality of nodes.

5. The method of claim 1 further comprising:
generating a model using the unsecured portion of the package, wherein in the step of generating the temperature map of the package, the thermal R-network and the model are used.

6. The method of claim 1, wherein the step of generating the temperature map of the package comprises generating a temperature map of a device die and a heat sink, wherein the device die and the heat sink are portions of the package.

7. The method of claim 1 further comprising:
before the generating the temperature map, merging the thermal R-network and the second component information of the unsecured portion, wherein the step of generating the temperature map is performed using the merged thermal R-network and the second component information.

8. A method comprising:
merging a thermal resistance-network (R-network) and a first component information of an unsecured portion of a package, wherein the thermal R-network represents a secured portion of the package, and wherein the secured portion and the unsecured portion are bonded to each other; and
generating a temperature map of the package using the thermal R-network and the first component information of the unsecured portion, wherein the step of generating the temperature map is performed by a computer.

9. The method of claim 8, wherein the first component information is not represented using a thermal R-network.

10. The method of claim 8 further comprising generating the thermal R-network using a second component information of the secured portion of the package, wherein the second component information comprises a structure file, and wherein the structure file describes a structure information of the secured portion of the package.

11. The method of claim 10, wherein the second component information further comprises a tech file, and wherein the tech file comprises thermal conductivities of materials specified in the structure file.

12. The method of claim 10, wherein the structure file describes a information selected from the group consisting essentially of a layer stacking information, a geometry information, a thickness information, a material information, and combinations thereof, of package components in the secured portion of the package.

13. The method of claim 8, wherein the thermal R-network comprises:
a plurality of nodes forming a three dimensional structure; and
a plurality of thermal resistors connected between neighboring ones of the plurality of nodes.

14. The method of claim 8 further comprising merging a node location information of the secured portion of the package with the first component information of the unsecured portion of the package, wherein the node location information is used in the step of generating the temperature map, and is used to specify relative positions of the secured portion and the unsecured portion.

15. A method comprising:
decrypting a component information of a secured portion of a package;
generating a thermal resistance-network (R-network) from the component information;
generating a location file of the secured portion of the package, wherein the step of generating the thermal R-network is performed using a computer; and
generating a temperature map of the package using the thermal R-network and an un-encrypted component information of an unsecured portion of the package, wherein the secured portion and the unsecured portion are bonded together.

16. The method of claim 15, wherein the component information comprises an information selected from the group consisting essentially of a layer stacking information, a geometry information, a thickness information, a material information, and combinations thereof, of package components in the secured portion of the package.

17. The method of claim 16, wherein the component information comprises a tech file comprising thermal conductivities of materials in the secured portion of the package.

18. The method of claim 15 further comprising:
merging the thermal R-network and the un-encrypted component information, wherein the step of generating the temperature map is performed using the merged thermal R-network and the un-encrypted component information.

19. The method of claim 18, wherein the steps of merging and generating the temperature map are performed using an Electronic Design Automation (EDA) tool.

* * * * *